United States Patent
Feng et al.

(10) Patent No.: US 12,021,582 B2
(45) Date of Patent: Jun. 25, 2024

(54) DETECTION METHOD AND DEVICE BASED ON SENSING-COMMUNICATION INTEGRATION

(71) Applicant: BEIJING UNIVERSITY OF POSTS AND TELECOMMUNICATIONS, Beijing (CN)

(72) Inventors: Zhiyong Feng, Beijing (CN); Zhiqing Wei, Beijing (CN); Hao Ma, Beijing (CN); Ping Zhang, Beijing (CN); Fan Ning, Beijing (CN); Qixun Zhang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 17/768,334

(22) PCT Filed: Sep. 30, 2020

(86) PCT No.: PCT/CN2020/119355
§ 371 (c)(1),
(2) Date: Apr. 12, 2022

(87) PCT Pub. No.: WO2021/073435
PCT Pub. Date: Apr. 22, 2021

(65) Prior Publication Data
US 2024/0171227 A1 May 23, 2024

(30) Foreign Application Priority Data
Oct. 17, 2019 (CN) .......................... 201910989675.6

(51) Int. Cl.
*H04B 7/04* (2017.01)
*G01S 7/00* (2006.01)
(Continued)

(52) U.S. Cl.
CPC ............ *H04B 7/0408* (2013.01); *G01S 7/003* (2013.01); *G01S 7/282* (2013.01); *H04B 7/0686* (2013.01)

(58) Field of Classification Search
CPC ..... H04B 7/0408; H04B 7/0686; G01S 7/003; G01S 7/282
See application file for complete search history.

(56) References Cited

U.S. PATENT DOCUMENTS

| 6,549,171 B1 | 4/2003 | Mailloux |
| 11,360,191 B2 * | 6/2022 | Izadian .................... G01S 13/87 |

(Continued)

FOREIGN PATENT DOCUMENTS

| CN | 101361308 A | 2/2009 |
| CN | 102662161 A | 9/2012 |

(Continued)

OTHER PUBLICATIONS

Hao Ma, "Performance Analysis of Joint Radar and Communication Enabled Vehicular Ad Hoc Network", 2019 IEEE/CIC International Conference on Communications in China (ICCC).

(Continued)

*Primary Examiner* — Dac V Ha
(74) *Attorney, Agent, or Firm* — CANTOR COLBURN LLP

(57) ABSTRACT

The embodiments of the present application provide a radar-sensing detection method and device based on radar-sensing communication integration. Said method comprises: when being applied to a sending end, determining a position of a receiving end, then sending a beam control signal to the receiving end through a preset beam control request channel, receiving a beam control response signal sent by the receiving end, and sending a first detection result signal to the receiving end in a preset reservation channel. The embodi- (Continued)

Determining a position of a receiving end based on a radar-sensing detection signal or a communication signal sent to the receiving end — S101

Sending a beam control signal to the receiving end through a preset beam control request channel according to the position of the receiving end — S102

Receiving a beam control response signal sent by the receiving end — S103

Sending the first detection result signal to the receiving end in a preset reservation data channel according to the sending delay and the sending channel frequency band — S104 ments of the present application can expand the detection range of an autonomous vehicle.

20 Claims, 9 Drawing Sheets

(51) Int. Cl.
 *G01S 7/282* (2006.01)
 *H04B 7/0408* (2017.01)
 *H04B 7/06* (2006.01)

(56) References Cited

U.S. PATENT DOCUMENTS

| | | | |
|---|---|---|---|
| 11,381,308 B1 * | 7/2022 | Sleator | ............... H04B 10/1149 |
| 2007/0164896 A1 | 7/2007 | Suzuki | |
| 2020/0317113 A1 * | 10/2020 | Dingli | .................... B60Q 1/143 |
| 2022/0057483 A1 * | 2/2022 | Feng | ......................... G01S 7/40 |
| 2023/0204740 A1 * | 6/2023 | Sachkov | ............... G01S 17/931 |
| | | | 356/4.01 |

FOREIGN PATENT DOCUMENTS

| | | |
|---|---|---|
| CN | 103001680 A | 3/2013 |
| CN | 106162925 A | 11/2016 |
| CN | 106575988 A | 4/2017 |
| CN | 106603150 A | 4/2017 |
| CN | 108601091 A | 9/2018 |
| CN | 110261856 A | 9/2019 |
| CN | 110726974 A | 1/2020 |
| KR | 101553159 B1 | 9/2015 |

OTHER PUBLICATIONS

International search Report for corresponding application PCT/CN2020/119355 filed Sep. 30, 2020; Mail date Jan. 4, 2021.

* cited by examiner

DETECTION METHOD AND DEVICE BASED ON SENSING-COMMUNICATION INTEGRATION

This application claims the priority of a Chinese patent application No. 201910989675.6 filed with the China National Intellectual Property Administration on Oct. 17, 2019, and entitled "Radar-Sensing Detection Method and Device based on Radar-Sensing Communication Integration", which is incorporated herein by reference in its entirety.

TECHNICAL FIELD

This application relates to the technical field of autonomous vehicles, in particular to a radar-sensing detection method and apparatus based on radar-sensing communication integration.

BACKGROUND

With the development of science and technology, vehicles are no longer simple means of transportation; radar-sensing equipment and communication equipment are becoming more and more common in vehicles. The radar-sensing equipment and communication equipment can constitute the detection equipment of vehicles.

In related technologies, the detection equipment carried by autonomous vehicles is mainly radar-sensing equipment and communication equipment that are isolated from each other, and radar-sensing equipment and communication equipment work completely independently. The radar-sensing equipment sends electromagnetic wave to irradiate the target and receives its echo, so as to obtain information such as a distance between the target and the electromagnetic wave sending point, change rate of distance (radial velocity), azimuth, altitude and other information; the communication equipment obtains position information of the target vehicle, and when the target vehicle is determined to be within its own communication range based on the position information, vehicle ID and other vehicle information of the vehicle will be sent to the target vehicle to complete the communication between the vehicle and the target vehicle.

In the above related technologies, due to the limitations of the spectrum and power of the radar-sensing equipment, the detection distance of the radar-sensing equipment of the autonomous vehicles itself is relatively close, which may lead to the problem that the detection range of the radar-sensing equipment of the autonomous vehicle is insufficient.

SUMMARY

The purpose of the embodiments of the present application is to provide a radar-sensing detection method and apparatus based on radar-sensing communication integration, so as to solve the problem that detection range of radar-sensing equipment of the autonomous vehicles is insufficient. The specific technical scheme is provided.

In the first aspect, an embodiment of the present application provides a radar-sensing detection method based on radar-sensing communication integration, which is applied to a sending end, including:
  determining a position of a receiving end based on a radar-sensing detection signal or a communication signal sent to the receiving end;
  sending a beam control signal to the receiving end through a preset beam control request channel according to the position of the receiving end, wherein the beam control signal carries beam control information, and the beam control information includes: frame control information, positioning request information, amount of data to be sent, beam occupation request information, channel occupation states, and spatial information check information; the frame control information is used to indicate demodulation information of the receiving end, and the positioning request information is used to broadcast vehicle information of the sending end itself, the beam occupation request information is used to request occupation of a spatial beam, the channel occupation states are used to inform the receiving end of an occupation state of a current channel, and the spatial information check information is configured for beam calibration;
  receiving a beam control response signal sent by the receiving end, wherein the beam control response signal carries a sending delay and a sending channel frequency band, and the sending delay is used to indicate a sending time for a first detection result signal to be sent, the sending channel frequency band is used to indicate a sending channel frequency band for the first detection result signal, and the first detection result signal is a signal that is generated by the sending end after detecting surrounding environment and carries position information of all vehicles within a preset detection range of the sending end;
  sending the first detection result signal to the receiving end in a preset reservation data channel according to the sending delay and the sending channel frequency band.

Alternatively, in a specific implementation, the step of determining a position of a receiving end based on a radar-sensing detection signal or a communication signal sent to the receiving end includes:
  sending the radar-sensing detection signal when a distance between the sending end and the receiving end is less than the preset detection range of the sending end;
  receiving a reflected signal of the radar-sensing detection signal;
  determining the position of the receiving end according to the reflected signal;
  or,
  sending a position information acquisition request to a road-side unit RSU when a distance between the sending end and the receiving end is greater than the preset detection range of the sending end and less than a preset communication range of the sending end, wherein the position acquisition request is used to acquire the position information of the receiving end;
  receiving a response message returned by the RSU, wherein the response message carries the position information of the receiving end.

Optionally, in a specific implementation, before the step of sending the first detection result signal to the receiving end in a preset reservation data channel according to the sending delay and the sending channel frequency band, the method further includes:
  pre-allocating sending angles for multiple beams of the first detection result signal to be sent according to a preset Butler beam allocation scheme, so that the beams are orthogonal to each other;
  sending the first detection result signal to the receiving end in a preset reservation data channel according to the sending delay and the sending channel frequency band, including:

sending, according to the sending delay and the sending channel frequency band, the first detection result signal to the receiving end through the sending angles pre-allocated for the multiple beams of the first detection result signal in the preset reservation data channel.

In the second aspect, the embodiment of the present application provides a radar-sensing detection method based on radar-sensing communication integration, which is applied to a receiving end, the method includes:

receiving a beam control signal sent by a sending end, wherein the beam control signal carries beam control information, and the beam control information includes: frame control information, positioning request information, amount of data to be sent, beam occupation request information, channel occupation states and spatial information check information; the frame control information can be used to indicate demodulation information of the receiving end, the positioning request information is used to broadcast vehicle information of the sending end itself, the beam occupation request information is used to request occupation of a spatial beam, the channel occupation states are used to inform the receiving end of an occupation state of a current channel, and the spatial information check information is used to indicate beam calibration;

sending a beam control response signal to the sending end through a preset beam control channel, wherein the beam control response signal carries a sending delay and a sending channel frequency band, and the sending delay is used to indicate a sending time for a first detection result signal to be sent, the sending channel frequency band is used to indicate a sending channel frequency band for the first detection result signal, and the first detection result signal is a signal that is generated by the sending end after detecting surrounding environment and carries position information of all vehicles within a preset detection range of the sending end;

receiving the first detection result signal sent by the sending end;

performing fusion processing on data in the first detection result signal and data in a second detection result signal to obtain fused data, wherein the second detection result signal carries position information of all vehicles within a preset detection range of the receiving end, data amount of the fused data is less than a sum of data amount of the data in the first detection result signal and data amount of the data in the second detection result signal.

Optionally, in a specific implementation, the step of performing fusion processing on data in the first detection result signal and data in the second detection result signal to obtain fused data includes:

performing fusion processing on a first data table recording the data in the first detection result signal and a second data table recording the data in the second detection result signal to obtain the fused data.

Optionally, in a specific implementation, the method further includes:

sending a signal carrying the fused data to a vehicle within a preset communication range of the receiving end.

In the third aspect, the embodiment of the present application provides a radar-sensing detection apparatus based on radar-sensing communication integration, which is applied to the sending end, the apparatus includes:

a determining module for determining a position of a receiving end based on a radar-sensing detection signal or a communication signal sent to the receiving end;

a first sending module, configured for sending a beam control signal to the receiving end through a preset beam control request channel according to the position of the receiving end, wherein the beam control signal carries beam control information, and the beam control information includes: frame control information, positioning request information, amount of data to be sent, beam occupation request information, channel occupation states and space information check information; the frame control information is used to indicate demodulation information of the receiving end, the positioning request information is used to broadcast vehicle information of the sending end itself, the beam occupation request information is used to request occupation of a spatial beam, the channel occupation states are used to inform the receiving end of an occupation state of a current channel, and the spatial information check information is used to indicate the beam calibration;

a first receiving module, configured for receiving a beam control response signal sent by the receiving end, wherein the beam control response signal carries a sending delay and a sending channel frequency band, the sending delay is used to indicate a sending time for a first detection result signal, and the sending channel frequency band is used to indicate a sending channel frequency band for the first detection result signal to be sent, the first detection result signal is a signal that is generated by the sending end after detecting surrounding environment and carries position information of all vehicles within a preset detection range of the sending end;

a second sending module, configured for sending the first detection result signal to the receiving end in a preset reservation data channel according to the sending delay and the sending channel frequency band.

Optionally, in a specific implementation, the determining module includes:

a first sending sub-module, configured for sending the radar-sensing detection signal when a distance between the sending end and the receiving end is less than the preset detection range of the sending end;

a first receiving sub-module, configured for receiving a reflected signal of the radar-sensing detection signal;

a first determining sub-module, configured for determining the position of the receiving end according to the reflected signal.

Optionally, in a specific implementation, the determining module includes:

a second sending sub-module, configured for sending a position information acquisition request to a RSU when a distance between the sending end and the receiving end is greater than the preset detection range of the sending end and less than a preset communication range of the sending end;

a second receiving sub-module, configured for receiving a response message returned by the RSU.

Optionally, in a specific implementation, the apparatus further includes:

an allocating module, configured for pre-allocating, before sending the first detection result signal to the receiving end in a preset reservation data channel according to the sending delay and the sending channel frequency band, sending angles for multiple beams of the first detection result signal to be sent according to a preset Butler beam allocation scheme so that the beams are orthogonal to each other;

wherein the second sending module is specifically configured for sending, according to the sending delay and the sending channel frequency band, the first detection result signal to the receiving end through the sending angles pre-allocated for the multiple beams of the first detection result signal in the preset reservation data channel.

In the fourth aspect, the embodiment of the present application provides a radar-sensing detection apparatus based on radar-sensing communication integration, which is applied to the receiving end, the apparatus includes:

a second receiving module, configured for receiving a beam control signal sent by a sending end, wherein the beam control signal carries beam control information, and the beam control information includes: frame control information, positioning request information, amount of data to be sent, beam occupation request information, channel occupation states and spatial information check information; the frame control information is used to indicate demodulation information of the receiving end, the positioning request information is used to broadcast vehicle information of the sending end itself, the beam occupation request information is used to request occupation of a spatial beam, the channel occupation states are used to inform the receiving end of an occupation state of a current channel, and the spatial information check information is used to indicate beam calibration;

a third sending module, configured for sending a beam control response signal to the sending end through a preset beam control channel, wherein the beam control response signal carries a sending delay and a sending channel frequency band, and the sending delay is used to indicate a sending time for a first detection result signal to be sent, the sending channel frequency band is used to indicate a sending channel frequency band for the first detection result signal, the first detection result signal is a signal that is generated by the sending end after detecting surrounding environment and carries position information of all vehicles within a preset detection range of the sending end;

a third receiving module, configured for receiving the first detection result signal sent by the sending end;

a fusing module, configured for performing fusion processing on data in the first detection result signal and data in a second detection result signal to obtain fused data, wherein the second detection result signal carries position information of all vehicles within a preset detection range of the receiving end, data amount of the fused data is less than a sum of data amount of the data in the first detection result signal and data amount of the data in the second detection result signal.

Optionally, in a specific implementation, the fusing module is specifically configured for:

performing fusion processing on a first data table recording the data in the first detection result signal and a second data table recording the data in the second detection result signal to obtain the fused data.

Optionally, in a specific implementation, the apparatus further includes:

a fourth sending module, configured for sending a signal carrying the fused data to a vehicle within a preset communication range of the receiving end.

In the fifth aspect, the embodiment of the application provides an electronic device wherein the electronic device is applied in an autonomous vehicle, including a processor, a communication interface, a memory and a communication bus, wherein the processor, the communication interface and the memory communicate with each other through the communication bus;

the memory is configured for storing computer programs;

the processor is configured for implementing the method steps of the first aspect and/or the second aspect when executing the computer program stored in the memory.

In the sixth aspect, the embodiment of the present application provides a computer-readable storage medium storing a computer program, wherein the computer program performs the method steps described in the first and/or second aspect when being executed by a processor.

In the seventh aspect, the embodiment of the present application provides a computer product including instructions, which when running on a computer, causes the computer to perform the method described in the first and/or second aspects above.

In the eighth aspect, there is provided a computer program, when running on a computer, causes the computer to perform the method described in the first and/or second aspects above.

When the scheme provided by the embodiment of the present application is applied to the sending end, the position of the receiving end is determined based on the radar-sensing detection signal or the communication signal sent to the receiving end; the beam control signal is sent to the receiving end through the preset beam control request channel; the beam control response signal sent by the receiving end is received; and the first detection result signal is sent to the receiving end in the preset reservation channel according to the sending delay and sending channel frequency band carried by the beam control response signal. Based on this, the autonomous vehicle as the receiving end can obtain not only the signal detected by its own radar-sensing equipment, but also the signal detected by the radar-sensing equipment of the autonomous vehicle as the sending end, so as to avoid the problem that detection range of the autonomous vehicle is insufficient due to the relatively short detection distance of its own radar-sensing equipment.

Further, when the scheme provided by the embodiment of the application is applied to the receiving end, it receives the beam control signal sent by the sending end; sends the beam control response signal to the sending end through the preset beam control channel; receives the first detection result signal sent by the sending end; and performs fusion processing on the information in the first detection result signal and the information in the second detection result signal to obtain fused data. Based on this, the autonomous vehicle as the receiving end can not only obtain the signal detected by its own radar-sensing equipment, but also obtain the signal detected by the radar-sensing equipment of the autonomous vehicle as the sending end, so as to avoid the problem that detection range of the autonomous vehicle is insufficient due to the relatively short detection distance of its own radar-sensing equipment. Moreover, since the receiving end performs fusion processing on the data in the first detection result signal and the data in the second detection result signal to obtain the fusion data, and the data amount of the fusion data is less than the sum of the data in the first detection result signal and the data in the second detection result signal, therefore, the storage space of the receiving end can store the location information of other vehicles more useful to the receiving end.

Apparently, it is not necessary for any product or method according to the present application to achieve all the advantages described above simultaneously.

BRIEF DESCRIPTION OF THE DRAWINGS

In order to explain the technical solutions of the embodiments of the present application and the prior art more clearly, drawings used in the embodiments and the prior art will be briefly described below, and it is apparent that the drawings in the description below are for only some embodiments of the present application and those skilled in the art can obtain other drawings according to these drawings without inventive efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those of ordinary skilled in the art without any creative efforts fall into the scope of protection defined by the present application.

Figure 1:
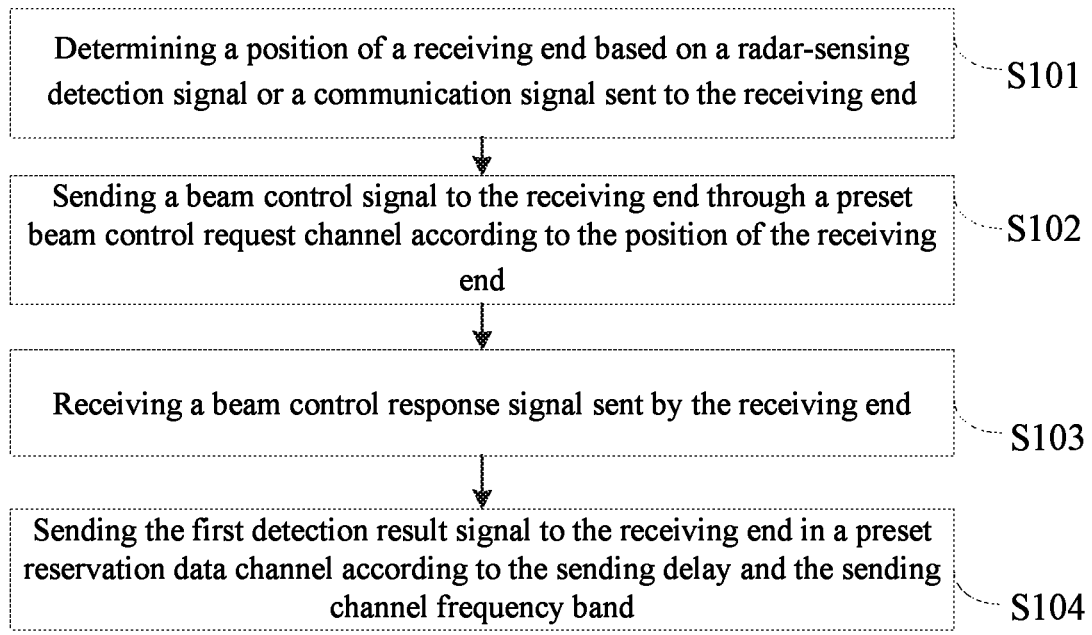
FIG. 1 is a flow diagram of a radar-sensing detection method based on radar-sensing communication integration applied to a sending end provided by an embodiment of the present application.

FIG. 1 is a flow diagram of a radar-sensing detection method based on radar-sensing communication integration provided by an embodiment of the present application, which is applied to the sending end. As shown in FIG. 1, the method can include the following steps:

S101, determining a position of a receiving end based on a radar-sensing detection signal or a communication signal sent to the receiving end.

Both the sending end and the receiving end can be an autonomous vehicle.

The radar-sensing detection signal can be a signal sent by the millimeter wave radar-sensing antenna of the autonomous vehicle. When the radar-sensing detection signal sent by the millimeter wave radar-sensing antenna of the autonomous vehicle as the sending end contacts other autonomous vehicles within a preset detection range, the other autonomous vehicles can be used as the receiving end to reflect the radar-sensing detection signal, then, the autonomous vehicle as the sending end can determine position information of other autonomous vehicles as the receiving end within the preset detection range according to the received reflected signal of the radar-sensing detection signal.

The preset detection range is the detection range of the millimeter wave radar-sensing of the autonomous vehicle. The preset detection range can be set by the technician according to the actual business needs, for example, the detection range can be set to 100 meters, 150 meters or 200 meters, etc., for which the embodiment of the present application is not specifically limited.

For the sake of description, in the following description, the above autonomous vehicle as the sending end and other autonomous vehicles as the receiving end are referred to as the sending end and the receiving end respectively.

The above communication signal can be a signal for communication between the sending end and the receiving end. When determining the position of the receiving end through the communication signal, first, the RSU (radio side unit) within the preset communication range of the sending end can send the radar-sensing detection signal with its own radar-sensing equipment and receive the reflected signal of the radar-sensing detection signal, so as to obtain the position information of the receiving end. Since the sending end has a communication connection with the RSU within its preset communication range so as to communicate, so when receiving the location information acquisition request for the sending end, the RSU can send the communication signal carrying the location information of the receiving end to the sending end.

The preset communication range is the communication range of the communication equipment of the autonomous vehicle. The preset communication range can be set by the technician according to the actual business needs, for example, the communication range can be set to 400 m, 500 m or 600 m, etc., for which the embodiment of the present application is not specifically limited.

As shown in FIGS. 2a to 2e, there can be a variety of positional relationships between the sending end and the receiving end.

Figure 2A:
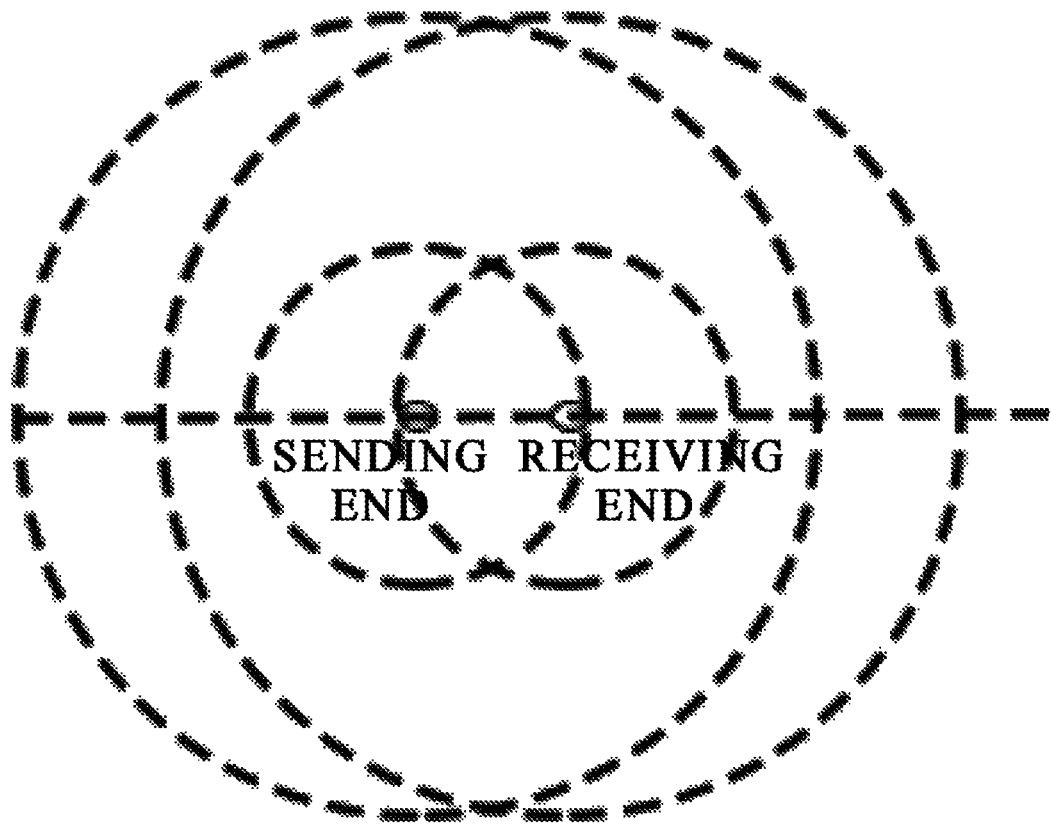
FIGS. 2a-2e are respectively scenario diagrams of positional relationship between a sending end and a receiving end provided by the embodiments of the present application.

A first position relationship, as shown in FIG. 2a, the receiving end is within the preset detection range of the sending end, and the sending end can send the radar-sensing detection signal and receive the reflected signal of the radar-sensing detection signal, so as to determine the position of the receiving end.

Then, based on the scenario shown in FIG. 2a, as an optional implementation of the embodiment of the present application, the above step S101 can include the following steps A-C:

Step A, sending the radar-sensing detection signal when a distance between the sending end and the receiving end is less than the preset detection range of the sending end;

Step B, receiving a reflected signal of the radar-sensing detection signal;

Step C, determining the position of the receiving end according to the reflected signal.

As shown in FIG. 2a, when the receiving end is within the preset detection range of the sending end, the sending end can send the radar-sensing detection signal and receive the reflected signal of the radar-sensing detection signal, so as to determine the position of the receiving end according to the reflected signal of the radar-sensing detection signal.

Figure 2B:
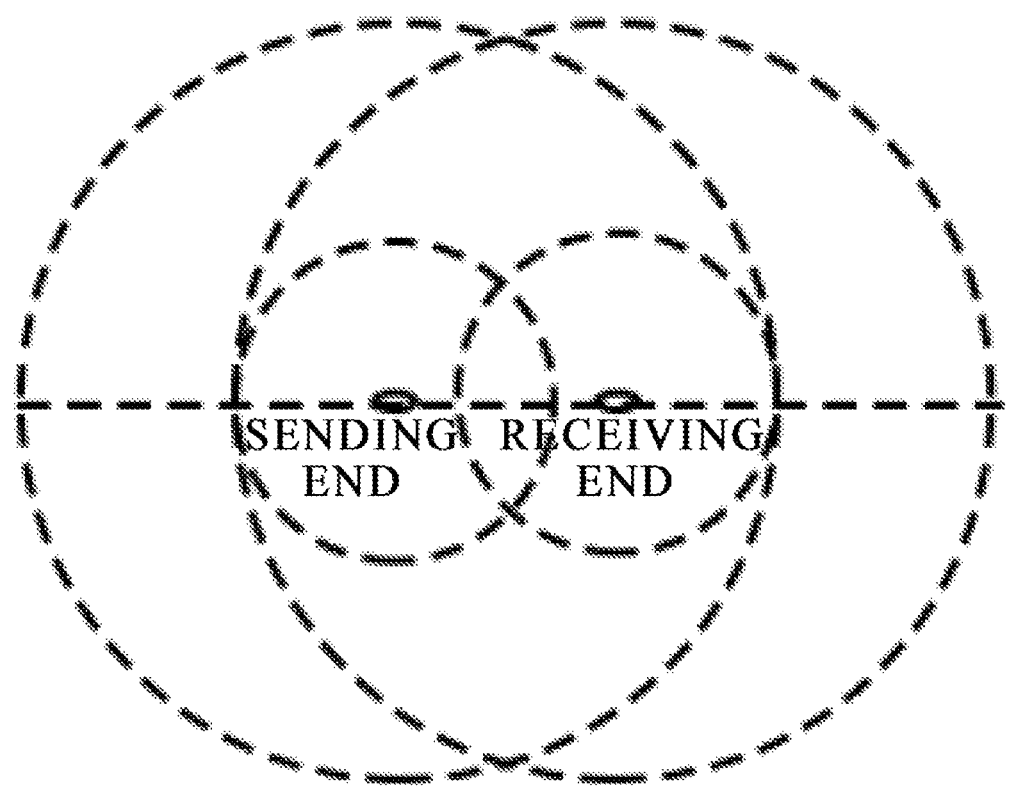
Figure 2C:
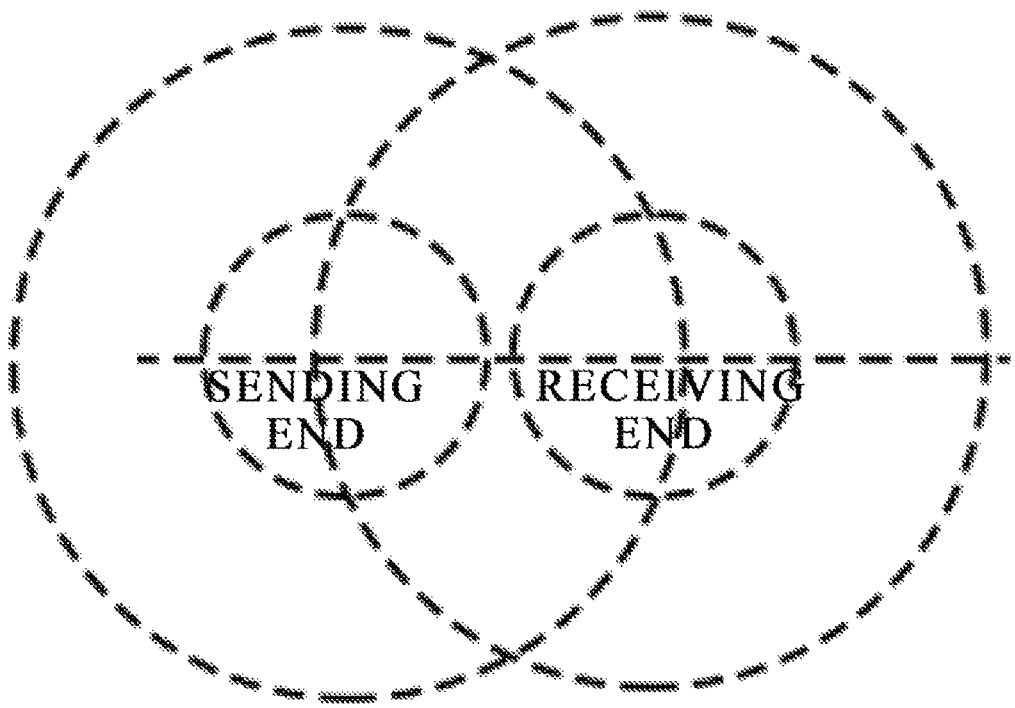

A second position relationship, as shown in FIG. 2b and FIG. 2c, the receiving end is not within the preset detection range of the sending end, but within the preset communication range of the sending end, the RSU within the preset communication range of the sending end can be used as a relay node to send the radar-sensing detection signal with its own radar-sensing and receive the reflected signal of the radar-sensing detection signal, to determine the position of the receiving end. Further, when receiving a location information acquisition request sent by the sending end, the RSU sends the determined location of the receiving end to the sending end in the form of a communication signal.

Referring to FIG. 2b, if the receiving end is not within the preset detection range of the sending end, but the preset detection range of the receiving end overlaps with the preset detection range of the sending end, it can indicate that the distance between the receiving end and the sending end is between 1 and 2 times of the preset detection range of the sending end, the sending end is close to the receiving end, and the sending end can communicate with the receiving end for many times so as to improve the accuracy of communication signals. Similarly, when the receiving end is within the preset detection range of the sending end, it means that the distance between the receiving end and the sending end is less than the detection range, and the sending end and the receiving end can communicate for many times.

Then, based on the scenarios shown in FIG. 2b and FIG. 2c, as an optional implementation of the embodiment of the present application, the above step S101 also includes the following steps A'-B':

Step A', when the distance between the sending end and the receiving end is greater than the preset detection range of the sending end and less than the preset communication range of the sending end, sending a location information acquisition request to the RSU, wherein the location information acquisition request is used to acquire the location information of the receiving end;

Step B', receiving a response message returned by the RSU, wherein the response message carries the location information of the receiving end.

As shown in FIG. 2b and FIG. 2c, when the receiving end is not within the preset detection range of the sending end, but within the preset communication range of the sending end, the RSU within the preset communication range of the sending end can be used as a relay node, to send the radar-sensing detection signal with its own radar-sensing and receive the reflected signal of the radar-sensing detection signal, to determine the position of the receiving end, and then, when receiving the location information acquisition request sent by the sending end, the RSU can send the determined location of the receiving end to the sending end in the form of a signal.

Figure 2D:
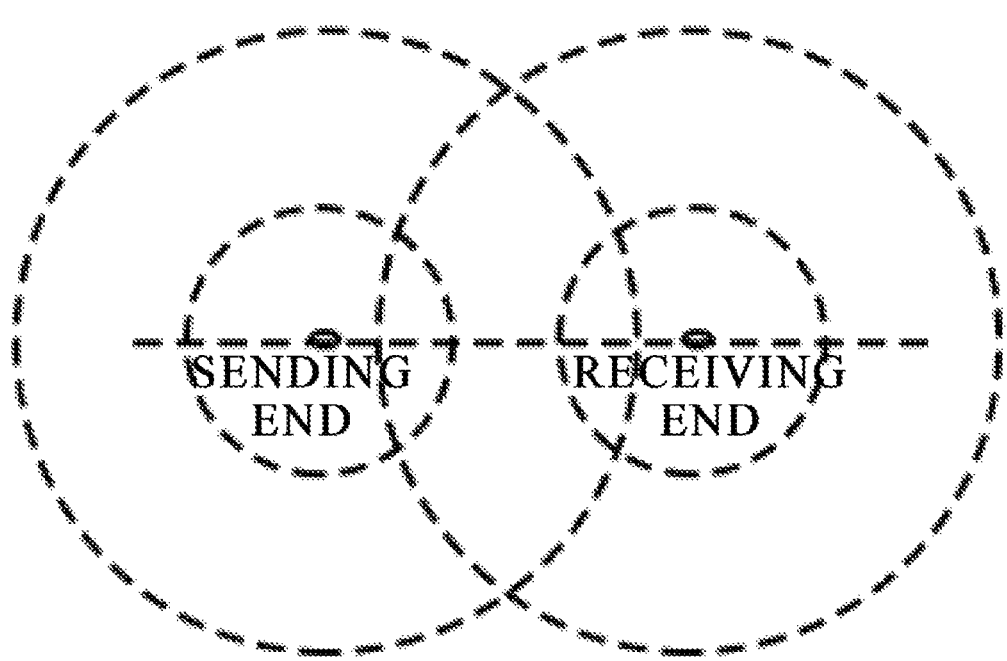

A third position relationship, as shown in FIG. 2d, if the receiving end is not within the preset communication range of the sending end, but the preset communication range of the sending end overlaps with the preset communication range of the receiving end, this situation belongs to communication interruption, that is, the sending end has obtained the position of the receiving end and communicated, but the communication is interrupted. After the communication is interrupted, the sending end performs communication broadcasting within its preset communication range to find a relay node storing the location information of the receiving end. If the relay node is found, the sending end sends a first detection result to the relay node, and then the relay node sends the first detection result to the receiving end.

Figure 2E:
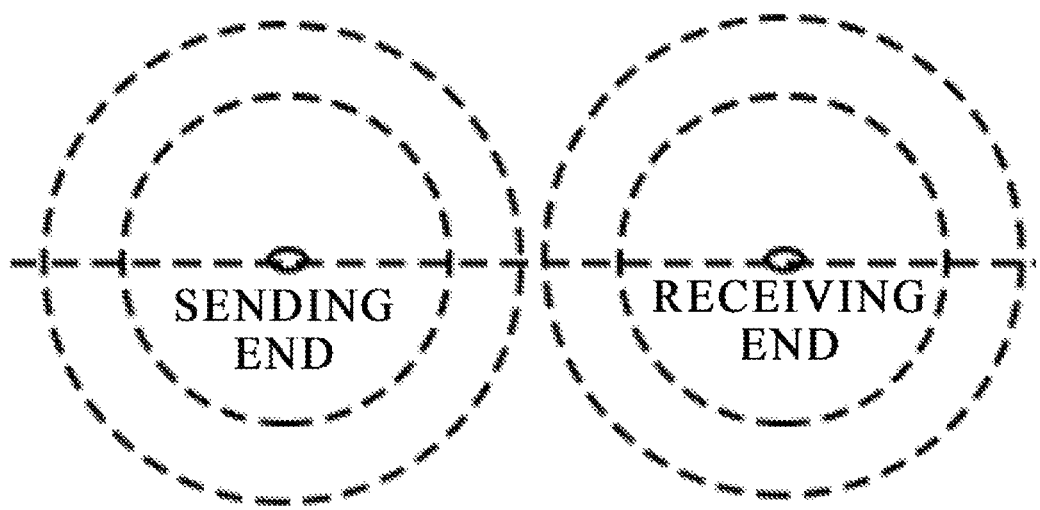

A fourth position relationship, as shown in FIG. 2e, if there is no overlap between the preset communication range of the receiving end and the preset communication range of the sending end, the sending end will no longer carry out directional communication, but allocate more time-frequency resources to the radar-sensing signal to enhance the detection function of the radar-sensing.

S102, sending a beam control signal to the receiving end through a preset beam control request channel according to the position of the receiving end.

The beam control signal can carry beam control information that includes frame control information, positioning request information, amount of data to be sent, beam occupation request information, channel occupation states and spatial information check information; wherein the frame control information is used to indicate demodulation information of the receiving end, the positioning request information is used to broadcast vehicle information of the sending end itself, the beam occupation request information is used to request occupation of a spatial beam, the channel occupation states are used to inform the receiving end of the occupation state of a current channel, and the spatial information check information is configured for beam calibration.

The sending end adopts the directional sending mode and sends the beam control signal to the receiving end through the preset beam control request channel. Compared with the omnidirectional sending mode, the signal in the directional sending mode has a smaller acceptable range, and the sending end needs to accurately align with the receiving end. Based on this, the sending end aligns the receiving end according to the position of the receiving end determined in step S101 above, and then sends the beam control signal to the receiving end.

It should be noted that in the embodiment of the present application, the sending end has the functions of signal sending and signal receiving, so that active detection and passive detection can be carried out simultaneously. The active detection is that the sending end actively sends a signal, and calculates physical state information such as the position and speed of the receiving end through the sending signal sent by the receiving end; Passive detection is that the receiving end calculates physical state information such as the position and speed of the sending end by receiving the signal sent by the sending end.

The preset beam control request channel can be set by technicians according to the actual service needs. For example, the beam control request channel can be set to 10

MHz, 15 MHz or 20 MHz, etc., for which the embodiment of the present application is not specifically limited.

The beam control information can be used to control a beam direction when the sending end sends the communication signal. Since the position of the receiving end may not be constant, the spatial information check information in the beam control information can be used to calibrate the pre-allocated beam direction.

In this way, the sending end sends the above beam control information to the receiving end, so that the receiving end can know the beam direction of the communication signal sent by the sending end, so that the receiving end can send a beam control response signal to the sending end according to the beam direction, so as to indicate in which frame the sending end can send the first detection result signal through a sending delay carried by the beam control response signal, and to indicate a sending channel frequency band in which the sending end sends the first detection result signal through a sending channel frequency band carried by the beam control response signal, that is, in which channel and in which frequency band of the channel the sending end sends the first detection result signal.

The beam control information can have the following functions: 1. communication perception and identification of surrounding vehicles; 2. synchronizing network time, positioning information and spatial beam information; 3. requesting data to be sent and informing the amount of data to be sent.

Figure 3:
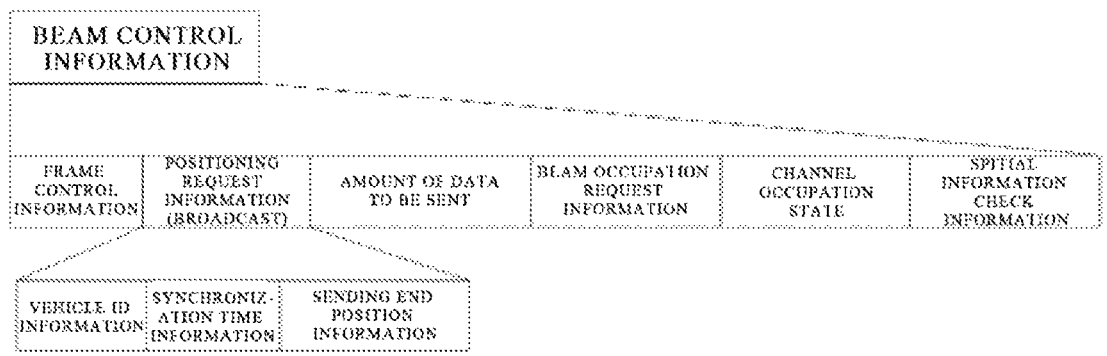
FIG. 3 is a structural diagram of a beam control information provided by an embodiment of the present application.

As shown in FIG. 3, a structural diagram of a beam control information is provided by the embodiment of the present application. The beam control information can include: frame control information, positioning request information (broadcast), amount of data to be sent, beam occupation request information, channel occupation states, and spatial information check information.

The frame control information can be used to indicate demodulation information of the receiving end; the positioning request information is used to broadcast vehicle information of sending end itself. The vehicle information can include ID information of the vehicle, synchronization time information and position information of the sending end, and the position information of the sending end can represent absolute position information of its own vehicle obtained by the sending end through beacon positioning; the amount of data to be sent can be used as the basis for time-frequency resource allocation; the beam occupation request information can be used to request the occupation of the spatial beam; the channel occupation states can be used to inform the receiving end of an occupation state of a current channel; the spatial information check information can be configured for beam calibration. The spatial information check information can contain position information of the receiving end at each time. Furthermore, when the position of the receiving end is offset, the sending end can slightly adjust the beam direction according to the change of the position of the receiving end, so as to avoid the collision of different signals in the same direction.

It should be noted that in the embodiment of the present application, the beam control information is sent according to the frame data structure. Therefore, all data in the beam control information must meet the synchronization and calibration of the data frame structure.

S103, receiving the beam control response signal sent by the receiving end.

The beam control response signal carries a sending delay and a sending channel frequency band. The sending delay is used to indicate the sending time for the first detection result signal to be sent, and the sending channel frequency band is used to indicate the sending channel frequency band for the first detection result signal. The first detection result signal is a signal that is generated by the sending end after detecting surrounding environment and carries position information of all vehicles within a preset detection range of the sending end.

Furthermore, the sending delay is used to indicate the sending time for the first detection result signal to be sent, that is, the sending delay can be used to indicate in which frame the first detection result signal is sent; the sending channel frequency band is used to indicate the sending channel frequency band for the first detection result signal, that is, the sending channel frequency band can be used to indicate in which channel and in which frequency band of the channel the first detection result signal is sent.

After the sending end sends the beam control signal to the receiving end, the receiving end can feed back a beam control response signal, which can carry the sending delay and sending channel frequency band.

As an optional implementation of the embodiment of the present application, the radar-sensing detection method provided by the embodiment of the present application can be applied to the MAC (Media Access Control) sublayer in the data link layer of the OSI (Open System Interconnection) reference model. The MAC sublayer can encapsulate the data in the first detection result signal into frames, and the length of each frame is fixed. When multiple sending ends send signals at the same time, the MAC sublayer can establish a reliable data link between the sending end and the receiving end, so as to solve the problem of competing for channels when multiple sending ends send the first detection result signal, and to make the sending end communicate with other vehicles within the preset communication range as much as possible.

Figure 4:
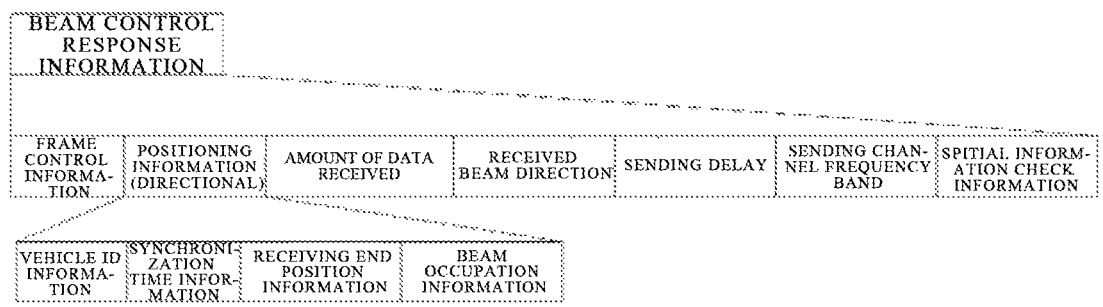
FIG. 4 is a structural diagram of a beam control response information provided by an embodiment of the present application.

As an optional implementation of the embodiment of the present application, as shown in FIG. 4, the above beam control response signal can also carry frame control information, positioning information (directional), amount of data received, received beam direction and spatial information check information.

The frame control information can be used to indicate demodulation information of the sending end; the positioning information is used to directionally send the vehicle information of the receiving end itself. The vehicle information can include ID information of the vehicle, synchronization time information, position information of the receiving end and beam occupation information. The position information of the receiving end can represent absolute position information of its own vehicle obtained by the receiving end through beacon positioning; the amount of data received is used to represent the size of received data; the receiving beam direction is used to indicate in which beam the first detection result signal is sent; the spatial information check information is configured for beam calibration to avoid mutual collision of different signals in the same direction.

S104, sending the first detection result signal to the receiving end in a preset reservation data channel according to the sending delay and the sending channel frequency band.

According to the sending delay and sending channel frequency band carried in the beam control response signal sent by the receiving end, the sending end can send the first detection result signal to the receiving end in a preset reservation data channel.

There can be many data channels within the preset communication range, and the above sending channel frequency band can indicate in which channel and in which frequency band of the channel the first detection result signal is sent, so that when multiple sending ends send the first detection result signal, the first detection result signal of each sending end can be sent in the appropriate channel and frequency band, so as to avoid collision among the first detection result signals of each sending end, and further avoid the problem of wasting channel frequency band resources.

It should be noted that the above preset reservation data channel can be set by technicians according to the actual service needs. For this, the embodiment of the present application is not specifically limited.

It can be seen that when the scheme provided by the embodiment of the present application is applied to the sending end, the position of the receiving end is determined based on the radar-sensing detection signal or the communication signal sent to the receiving end; the beam control signal is sent to the receiving end through the preset beam control request channel; the beam control response signal sent by the receiving end is received; and according to the sending delay and sending channel frequency band carried by the beam control response signal, the first detection result signal is sent to the receiving end in the preset reservation data channel. Based on this, the autonomous vehicle as the receiving end can obtain not only the signal detected by its own radar-sensing equipment, but also the signal detected by the radar-sensing equipment of the autonomous vehicle as the sending end, so as to avoid the problem that the detection range of the autonomous vehicle is insufficient due to the relatively short detection distance of its own radar-sensing equipment.

Figure 5:
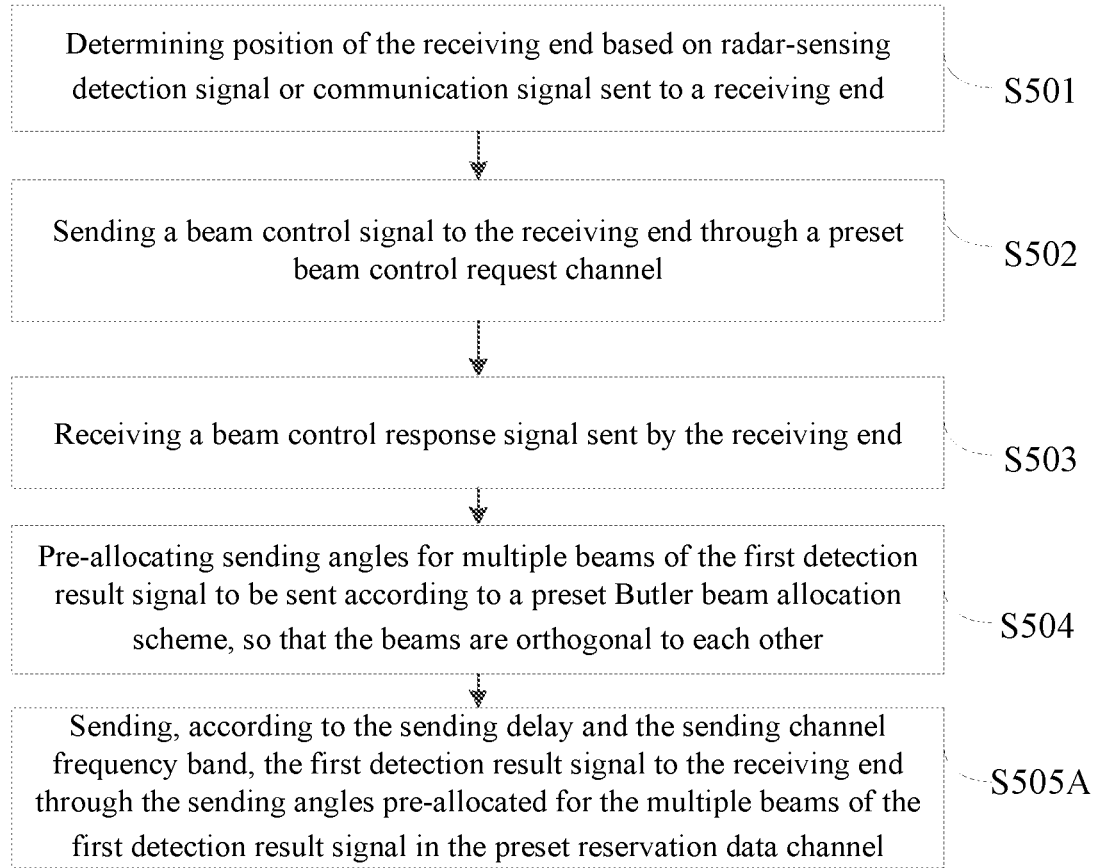
FIG. 5 is a flow diagram of another radar-sensing detection method based on radar-sensing communication integration applied to the sending end provided by the embodiment of the present application.

As an optional implementation of the embodiment of the present application, FIG. 5 is a flow diagram of another radar-sensing detection method based on radar-sensing communication integration provided by the embodiment of the present application, which is applied to the sending end. As shown in FIG. 5, the method can include the following steps:

S501, determining position of the receiving end based on radar-sensing detection signal or communication signal sent to a receiving end;

S502, sending a beam control signal to the receiving end through a preset beam control request channel;

S503, receiving a beam control response signal sent by the receiving end.

The above steps S501-S503 are the same as steps S101-S103 in the above embodiment shown in FIG. 1, and will not be repeated here.

S504, pre-allocating sending angles for multiple beams of the first detection result signal to be sent according to a preset Butler beam allocation scheme, so that the beams are orthogonal to each other.

The Butler beam allocation scheme is: calculating the number of beams with Butler matrix, and determining beam width of each beam according to the number of beams and preset communication range, which is used to represent sending angle of the beam.

In the embodiment of the present application, for the first detection result signal detected for the first time, a wide beam width can be set for each beam during signal sending. However, when the beam width of each beam is large, a large signal loss will occur in the process of signal sending, therefore the beam width of each beam can be gradually reduced during subsequent multiple detection of first detection result signals and the completion of multiple signal sending, so as to improve the signal sending efficiency.

The condition that the beams are orthogonal to each other is that in the peak direction of one beam, the main lobe and side lobe of other beams are the minimum.

The slight difference among sending angles of beams will seriously affect the orthogonality between beams. If one beam is not orthogonal to other beams, the side lobe of the non-orthogonal beam will cause noise interference to the main lobe of other beams. In this way, the signal-to-noise ratio of the signal received by the receiving end will be reduced, which can lead to unsuccessful communication. Therefore, in order to realize that beams are orthogonal to each other without affecting the normal communication, the sending angle of beams needs to be pre-allocated.

Pre-allocating the sending angle of the beam is to divide the preset communication range into multiple interval areas with equal angle, and one interval area can represent one beam width. The number of beams can be calculated through Butler matrix, and then, the beam width of each beam can be determined by combining the calculated number of beams and the preset communication range.

Figure 6:
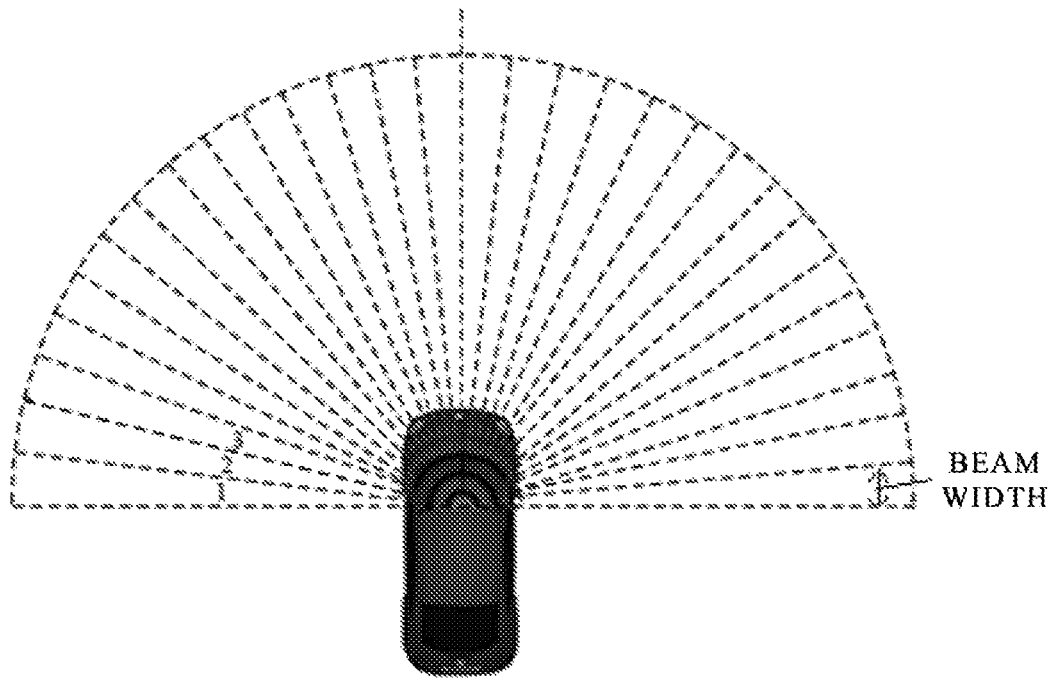
FIG. 6 is a spatial distribution diagram of a pre-allocated beam provided by an embodiment of the present application.

As shown in FIG. 6, when the beam width is known, a plurality of equiangular interval areas within the preset communication range can be numbered as 1, 2, 3, . . . , n respectively. In each numbered direction, a beam with the same width corresponding to the angle of the interval area in the direction can be sent through the sending chip. Each beam is orthogonal to each other, that is, the first detection result signals to be sent do not interfere with each other.

For example, if the calculated number of beams is 6 and the preset communication range is 180 degrees, the beam width of each beam is 30 degrees.

It should be noted that the Butler beam allocation scheme mentioned above is only an example of the method for allocating the number of beams, but not a limitation. In addition to the Butler beam allocation scheme mentioned above, the embodiment of the present application can also allocate the number of beams by other methods, and determine the beam width of each beam according to the number of beams and the preset communication range.

In addition, the embodiment of the present application does not limit the specific execution order of the above step S504 as long as it is executed before the subsequent step S505.

Accordingly, the above step S505, sending the first detection result signal to the receiving end in the preset reservation data channel according to the sending delay and the sending channel frequency band, that is, which can include the following steps:

S505A: sending, according to the sending delay and the sending channel frequency band, the first detection result signal to the receiving end through the sending angles pre-allocated for the multiple beams of the first detection result signal in the preset reservation data channel.

According to the sending delay and the sending channel frequency band carried in the beam control response signal sent by the receiving end, when the sending end sends the first detection result signal to the receiving end in the preset reserved data channel, the first detection result signal can be sent through the sending angle pre-allocated for multiple beams of the first detection result signal in the above step S504.

There can be many data channels within the preset communication range, and the above sending channel frequency band can indicate in which channel and in which frequency band of the channel the first detection result signal is sent, so that when multiple sending ends send the first detection result signal, the first detection result signal of each sending end can be sent in the appropriate channel and frequency band, so as to avoid collision among the first detection result signals of each sending end, and further avoid the problem of wasting channel frequency band resources.

It should be noted that the above preset reservation data channel can be set by technicians according to the actual service needs. For this, the embodiment of the application is not specifically limited.

In this embodiment, the autonomous vehicle as the receiving end can obtain not only the signal detected by its own radar-sensing equipment, but also the signal detected by the radar-sensing equipment of the autonomous vehicle as the sending end, so as to avoid the problem that the detection range of the autonomous vehicle is insufficient due to the relatively short detection distance of its own radar-sensing equipment. Furthermore, according to the preset Butler beam allocation scheme, pre-allocating the sending angles for multiple beams of the first detection result signal to be sent can also make each beam orthogonal to each other, so as to improve the transmission performance of the signal.

Figure 7:
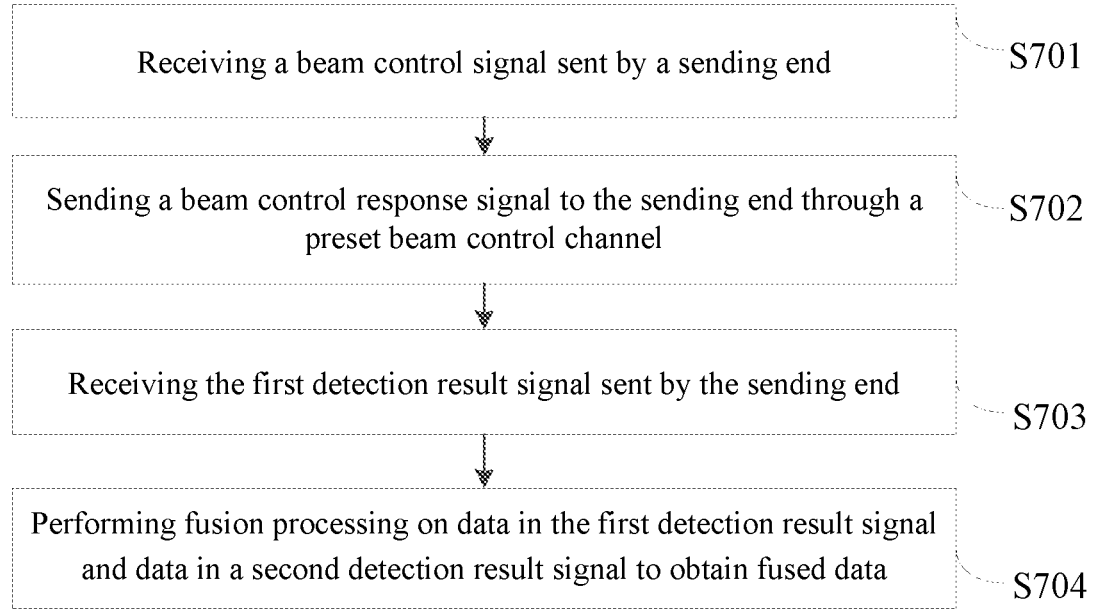
FIG. 7 is a flow diagram of a radar-sensing detection method based on radar-sensing communication integration applied to the receiving end provided by an embodiment of the present application.

FIG. 7 is a flow diagram of a radar-sensing detection method based on radar-sensing communication integration provided by an embodiment of the present application, which is applied to the receiving end. As shown in FIG. 7, the method can include the following steps.

S701, receiving a beam control signal sent by a sending end.

The beam control signal carries beam control information that includes frame control information, positioning request information, amount of data to be sent, beam occupation request information, channel occupation states and spatial information check information; wherein the frame control information is used to indicate demodulation information of the receiving end, the positioning request information is used to broadcast vehicle information of the sending end itself, the beam occupation request information is used to request occupation of a spatial beam, the channel occupation states are used to inform the receiving end of an occupation state of a current channel, and the spatial information check information is used to indicate the beam calibration.

Wherein the vehicle information of the sending end itself broadcasted by the positioning request information can include: ID information of the vehicle, synchronization time information and absolute position information of its own vehicle obtained by the sending end through beacon positioning; the above amount of data to be sent can be used as the basis for time-frequency resource allocation.

Moreover, for the above beam occupation request information, after a allocation of fixed angle is carried out according to the Butler beam allocation scheme, the beam resources in each direction are fixed.

In addition, calibrating the beam by using the above spatial information check information can avoid the collision of different signals in the same direction.

S702, sending a beam control response signal to the sending end through a preset beam control channel.

The beam control response signal carries beam control response information including sending delay and sending channel frequency band, the sending delay is used to indicate a sending time for a first detection result signal to be sent, the sending channel frequency band is used to indicate a sending channel frequency band for the first detection result signal, and the first detection result signal is a signal that is generated by the sending end after detecting the surrounding environment and carries the position information of all vehicles within a preset detection range of the sending end.

Furthermore, the sending delay is used to indicate the sending time for the first detection result signal to be sent, that is, the sending delay can be used to indicate in which frame the first detection result signal is sent; the sending channel frequency band is used to indicate the sending channel frequency band for the first detection result signal, that is, the sending channel frequency band can be used to indicate in which channel and in which frequency band of the channel the first detection result signal is sent.

After receiving the beam control signal sent by the sending end, the receiving end sends a beam control response signal to the sending end in response to request information for the beam control signal. The beam control response information can allocate appropriate time-frequency resources for the first detection result signal when the subsequent sending end sends the first detection result signal.

The preset beam control channel can be set by technicians according to the actual service needs. For example, the beam control channel can be set to 10 MHz, 15 MHz and 20 MHz, etc., for which the embodiment of the present application is not specifically limited.

As an optional implementation of the embodiment of the present application, the above beam control response signal can also carry frame control information, positioning information, amount of data received, received beam direction and spatial information check information.

The frame control information can be used to indicate demodulation information of the sending end; the positioning information is used to directionally send the vehicle information of the receiving end itself. The vehicle information can include ID information of the vehicle, synchronization time information, absolute position information of its own vehicle obtained by the receiving end through beacon positioning, and beam occupation information; the amount of data received is used to represent the size of received data; the receiving beam direction is used to indicate in which beam the first detection result signal is sent, and the sending delay is used to indicate in which frame the first detection result signal is sent; the sending channel frequency band is used to indicate in which channel and in which frequency band of the channel the first detection result signal is sent; spatial information check information is configured for beam calibration to avoid mutual collision of different signals in the same direction.

Further, the sending end can transmit according to the time-frequency resource allocation scheme in the beam control response signal sent by the receiving end.

Figure 8:
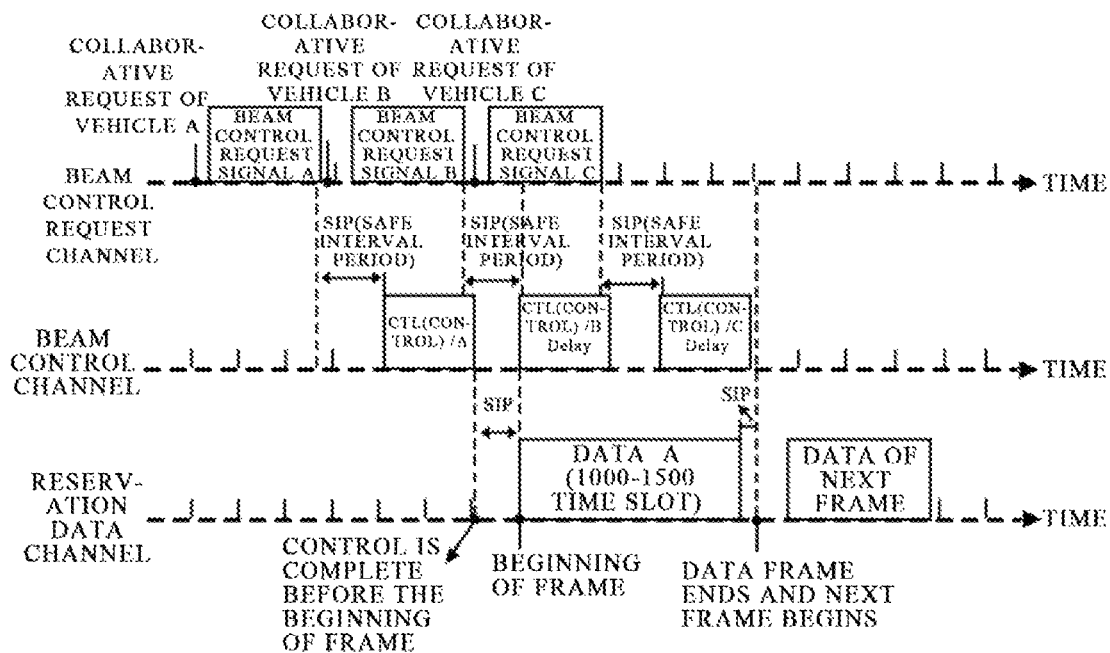
FIG. 8 is a schematic diagram of a transmission scheme provided by an embodiment of the present application.

As an optional implementation of the embodiment of the present application, as shown in FIG. 8, it is a schematic diagram of a transmission scheme provided by an embodiment of the present application.

After the sending end enters a certain regional communication network, it waits for the first complete time slot to send the beam control signal to the target receiving vehicle. After the target receiving vehicle receives the beam control signal, it sets a SIP (Safe Interval Period) to complete the transmission, finds the coverage beam in the sending direction of the sending end, and sends CTL (Control) signals to the target sending vehicle.

The control of the data of the next frame needs to be completed in the time slot of the previous frame, exemplarily, if the transmission of data A is not completed within the specified frame of the reservation data channel or the remaining time slot in the frame is not enough to complete the transmission of data B, the beam control channel will set a Delay to indicate data B to sent in the starting time slot of the next frame.

When the beam control request signals of two vehicles collide, retransmission shall be carried out according to the principle of random back-off.

Figure 9:
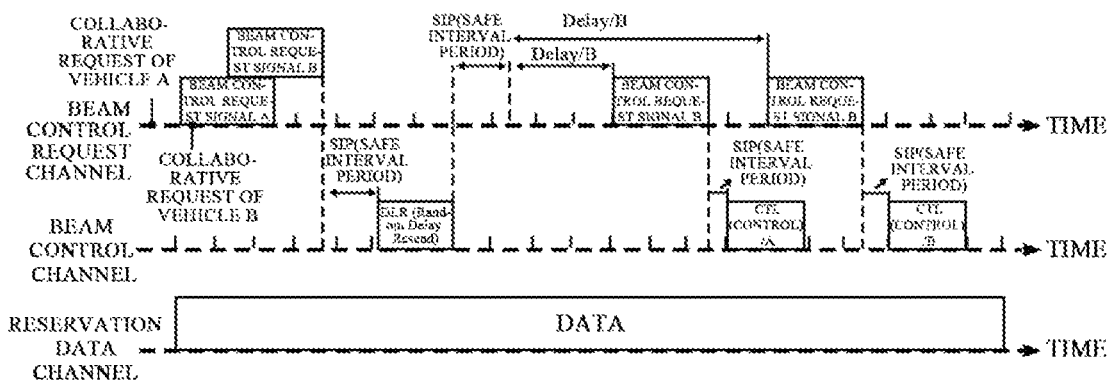
FIG. 9 is a schematic diagram of a retransmission scheme provided by the embodiment of the present application.

Based on this, as an optional implementation of the embodiment of the present application, as shown in FIG. 9, it is a schematic diagram of a retransmission scheme provided by an embodiment of the present application.

The beam control request signal from vehicle B arrives before the beam control request signal from vehicle A is received, and in this case, the beam control request signals from the two vehicles collide. After receiving the beam control request signals of vehicle A and vehicle B, the target receiving vehicle sends DLR (Random Delay Resend) signal to vehicle B. After receiving the DLR signal, vehicle B immediately sends the beam control request signal with multiple delay.

All beam control request signals within the preset communication range are transmitted on one beam control request channel, all beam control response signals are transmitted on the beam control channel, and there can be many reservation data channels for transmitting the first detection result. Suppose that vehicles A, B, C and D are the target sending vehicles that make requests in sequence within the frame duration, and L-1, L-2 . . . L-N are reservation data channel of the frequency division multiplexing.

In the same sending direction, the signal is transmitted through the same beam. In this case, it is necessary to allocate time-frequency resources in manner of orthogonal time-frequency. In the orthogonal time-frequency structure data channel model, the signal to be sent is divided into fixed length frames, and the beam calibration can be carried out before the beginning of each frame. Wherein the beam calibration includes the calibration of synchronous clock information to control the beam direction, so as to avoid conflict when sending signals.

S703, receiving the first detection result signal sent by the sending end.

S704, performing fusion processing on data in the first detection result signal and data in a second detection result signal to obtain fused data.

The second detection result signal carries position information of all vehicles within a preset detection range of the receiving end, and data amount of the fused data is less than a sum of data amount of the data in the first detection result signal and data amount of the data in the second detection result signal.

After receiving the first detection result signal, the receiving end sends the first detection result signal to its own on-board fusion center, and performs fusion processing on the data in the first detection result signal and the data in the second detection result signal, leaving the information of other adjacent vehicles within the preset detection range of the receiving end which is more useful to the receiving end. The second detection result signal can be the position information of all adjacent vehicles within the preset detection range obtained, by the receiving end by sending the radar-sensing detection signal through the millimeter wave radar-sensing antenna and receiving the signal reflected by other vehicles on the radar-sensing detection information within the preset detection range, or the information that has been fused before this fusion processing.

Exemplarily, vehicle A receives the first detection result signal of vehicle B sent by vehicle B within the preset communication range, and the data in the second detection result signal of vehicle A and the data in the first detection result signal of vehicle B are fused to obtain the fused data. When receiving the first detection result signal of vehicle C sent by vehicle C within the preset communication range, the data in the first detection result signal of vehicle C and the above fused data are fused to obtain new fused data.

As an optional implementation of the embodiment of the present application, the above step S704, performing fusion processing on the data in the first detection result signal and the data in the second detection result signal to obtain the fused data may include the following steps:

performing fusion processing on a first data table recording the data in the first detection result signal and a second data table recording the data in the second detection result signal to obtain the fused data.

The data in the first detection result signal is recorded on the first data table, the first data table records data generated by the sending end after detecting the surrounding environment in the first detection result signal, and the data carries obstacle information and the position information of all vehicles within the preset detection range of the sending end; and the data in the second detection result signal is recorded on the second data table, the second data table records data generated by the receiving end after detecting the surrounding environment in the second detection result signal, and the data carries obstacle information and the position information of all vehicles within the preset detection range of the receiving end. The fusion processing on the data in the first detection result signal and the data in the second detection result signal is to combine the first data table and the second data table into one data table.

However, since the storage capacity of the data table is limited, when the amount of data stored in the data table exceeds a certain value, for example, 760 kb/s, the receiving end will remove the position information of vehicles outside the preset distance range to leave the position information of other vehicles that are more useful for the receiving end.

The preset distance range can be set by technicians according to the actual service needs. For example, the distance range can be set to 10 m, 20 m or 30 m, etc., for which the embodiment of the present application is not specifically limited.

Figure 10:
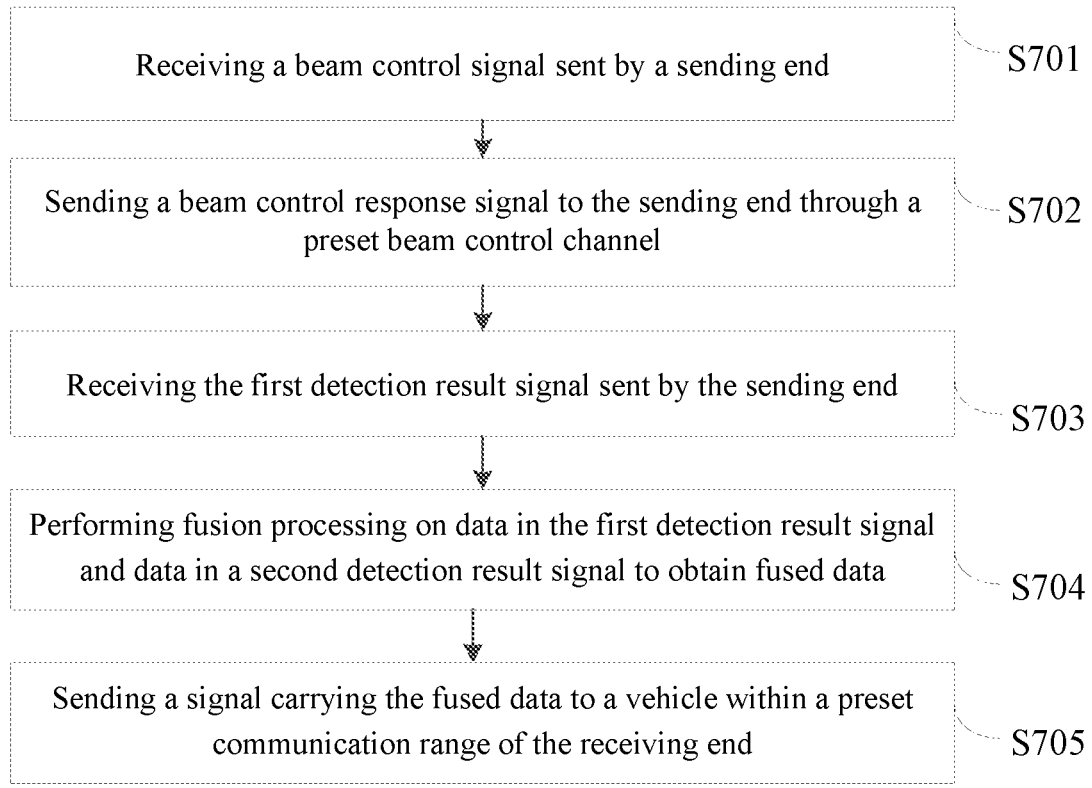
FIG. 10 is a flow diagram of another radar-sensing detection method based on radar-sensing communication integration applied to the receiving end provided by an embodiment of the present application.

As an optional implementation of the embodiment of the present application, on the basis of the embodiment shown in FIG. 5, FIG. 10 is a flow diagram of another radar-sensing detection method based on radar-sensing communication integration in the embodiment of the application, which is applied to the receiving end. As shown in FIG. 10, the method can also include:

S705, sending a signal carrying the fused data to a vehicle within a preset communication range of the receiving end.

When obtaining the fused data, the receiving end can communicate with other vehicles within the preset communication range and send the fused data to other vehicles.

It can be seen that when the scheme provided by the embodiment of the present application is applied to the receiving end, it receives the beam control signal sent by the sending end; sends the beam control response signal to the sending end through the preset beam control channel; receives the first detection result signal sent by the sending end; and performs fusion processing on the information in the first detection result signal and the information in the second detection result signal to obtain fused data. Based on this, the autonomous vehicle as the receiving end can not only obtain the signal detected by its own radar-sensing equipment, but also obtain the signal detected by the radar-sensing equipment of the autonomous vehicle as the sending end, so as to avoid the problem that detection range of the autonomous vehicle is insufficient due to the relatively short detection distance of its own radar-sensing equipment.

Moreover, since the receiving end performs fusion processing on the data in the first detection result signal and the data in the second detection result signal to obtain the fused data, and the data amount of the fused data is less than the sum of the data amount of the data in the first detection result signal and the data amount of the data in the second detection result signal, therefore, the storage space of the receiving end can store the position information of other vehicles more useful to the receiving end.

Figure 11:
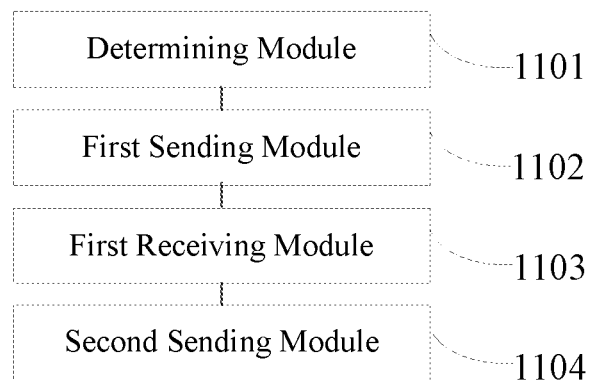
FIG. 11 is a structural diagram of a radar-sensing detection apparatus based on radar-sensing communication integration applied to the sending end provided by an embodiment of the present application.

FIG. 11 is a structural diagram of a radar-sensing detection apparatus based on radar-sensing communication integration provided by the embodiment of the present application, which is applied to the sending end. As shown in FIG. 11, the apparatus can include the following modules:

a determining module 1101 is configured for determining a position of a receiving end based on a radar-sensing detection signal or a communication signal sent to the receiving end;

a first sending module 1102 is configured for sending a beam control signal to the receiving end through a preset beam control request channel, wherein the beam control signal carries beam control information, and the beam control information includes: frame control information, positioning request information, amount of data to be sent, beam occupation request information, channel occupation states and space information check information; the frame control information is used to indicate demodulation information of the receiving end, the positioning request information is used to broadcast vehicle information of the sending end itself, the beam occupation request information is used to request occupation of a spatial beam, the channel occupation states are used to inform the receiving end of an occupation state of a current channel, and the spatial information check information is used to indicate the beam calibration;

a first receiving module 1103 is configured for receiving a beam control response signal sent by the receiving end, wherein the beam control response signal carries a sending delay and a sending channel frequency band, the sending delay is used to indicate a sending time for a first detection result signal, and the sending channel frequency band is used to indicate a sending channel frequency band for the first detection result signal to be sent, the first detection result signal is a signal that is generated by the sending end after detecting the surrounding environment and carries the position information of all vehicles within the preset detection range of the sending end;

a second sending module 1104 is configured for sending the first detection result signal to the receiving end in a preset reservation data channel according to the sending delay and the sending channel frequency band.

As an optional implementation of the embodiment of the present application, the above determining module 401 includes:

a first sending sub-module is configured for sending the radar-sensing detection signal when a distance between the sending end and the receiving end is less than the preset detection range of the sending end;

a first receiving sub-module is configured for receiving a reflected signal of the radar-sensing detection signal;

a determining sub-module is configured for determining the position of the receiving end according to the reflected signal.

As an optional implementation of the embodiment of the present application, the above determining module 401 includes:

a second sending sub-module is configured for sending a position information acquisition request to a RSU when the distance between the sending end and the receiving end is greater than the preset detection range of the sending end and less than the preset communication range of the sending end;

a second receiving sub-module is configured for receiving a response message returned by the RSU.

As an optional implementation of the embodiment of the present application, the apparatus can also include:

an allocating module is configured for pre-allocating sending angles for multiple beams of the first detection result signal to be sent according to a preset Butler beam allocation scheme, so that the respective beams are orthogonal to each other;

the second sending module is specifically configured for sending, according to the sending delay and the sending channel frequency band, the first detection result signal to the receiving end through the sending angles pre-allocated for the multiple beams of the first detection result signal in the preset reservation data channel.

It can be seen that when the scheme provided by the embodiment of the present application is applied to the sending end, the position of the receiving end is determined based on the radar-sensing detection signal or communication signal sent to the receiving end; the beam control signal is sent to the receiving end through the preset beam control request channel; the beam control response signal sent by the receiving end is received; and the first detection result signal is sent to the receiving end in the preset reservation channel according to the sending delay and sending channel frequency band carried by the beam control response signal. Based on this, the autonomous vehicle as the receiving end can obtain not only the signal detected by its own radar-sensing equipment, but also the signal detected by the radar-sensing equipment of the autonomous vehicle as the sending end, so as to avoid the problem that the detection range of the autonomous vehicle is insufficient due to the relatively short detection distance of its own radar-sensing equipment.

Figure 12:
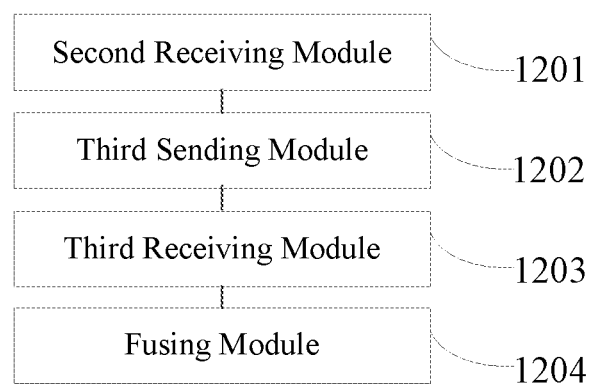
FIG. 12 is a structural diagram of a radar-sensing detection apparatus based on radar-sensing communication integration applied to the receiving end provided by an embodiment of the present application.

FIG. 12 is a structural diagram of a radar-sensing detection apparatus based on radar-sensing communication integration provided by an embodiment of the present application, which is applied to the receiving end. As shown in FIG. 12, the apparatus can include the following modules:

a second receiving module 1201 is configured for receiving a beam control signal sent by a sending end, wherein the beam control signal carries beam control information, and the beam control information includes: frame control information, positioning request information, amount of data to be sent, beam occupation request information, channel occupation states and spatial information check information; the frame control information is used to indicate demodulation information of the receiving end, the positioning request information is used to broadcast vehicle information of the sending end itself, the beam occupation request information is used to request the occupation of the spatial beam, the channel occupation states are used to inform the receiving end of an occupation state of a current channel, and the spatial information check information is used to indicate the beam calibration;

a third sending module 1202 is configured for sending a beam control response signal to the sending end through a preset beam control channel, wherein the beam control response signal carries a sending delay and a sending channel frequency band, and the sending delay is used to indicate a sending time for a first detection result signal to be sent, the sending channel frequency band is used to indicate a sending channel frequency band for the first detection result signal, the first detection result signal is a signal that is generated by the sending end after detecting the surrounding environment and carries the position information of all vehicles within the preset detection range of the sending end;

a third receiving module 1203 is configured for receiving the first detection result signal sent by the sending end;

a fusing module 1204 is configured for performing fusion processing on the data in the first detection result signal and the data in the second detection result signal to obtain fused data, wherein the second detection result signal carries position information of all vehicles within a preset detection range of the receiving end, data amount of the fused data is less than a sum of the data amount of the data in the first detection result signal and data amount of the data in the second detection result signal.

As an optional implementation of the embodiment of the present application, the fusing module 1204 is specifically configured for:

performing fusion processing on a first data table recording the data in the first detection result signal and a second data table recording the data in the second detection result signal to obtain the fused data.

As an optional implementation of the embodiment of the present application, the apparatus can further include:

A fourth sending module is configured for sending a signal carrying the fused data to a vehicle within a preset communication range of the receiving end.

It can be seen that when the scheme provided by the embodiment of the present application is applied to the receiving end, it receives the beam control signal sent by the sending end; sends the beam control response signal to the sending end through the preset beam control channel; receives the first detection result signal sent by the sending end; and performs fusion processing on the information in the first detection result signal and the information in the second detection result signal to obtain the fused data. Based on this, the autonomous vehicle as the receiving end can not only obtain the signal detected by its own radar-sensing equipment, but also obtain the signal detected by the radar-sensing equipment of the autonomous vehicle as the sending end, so as to avoid the problem that detection range of the autonomous vehicle is insufficient due to the relatively short detection distance of its own radar-sensing equipment.

Moreover, since the receiving end performs fusion processing on the data in the first detection result signal and the data in the second detection result signal to obtain the fused data, and the data amount of the fused data is less than the sum of the data amount of the data in the first detection result signal and the data amount of the data in the second detection result signal, therefore, the storage space of the receiving end can store the position information of other vehicles more useful to the receiving end.

Figure 13:
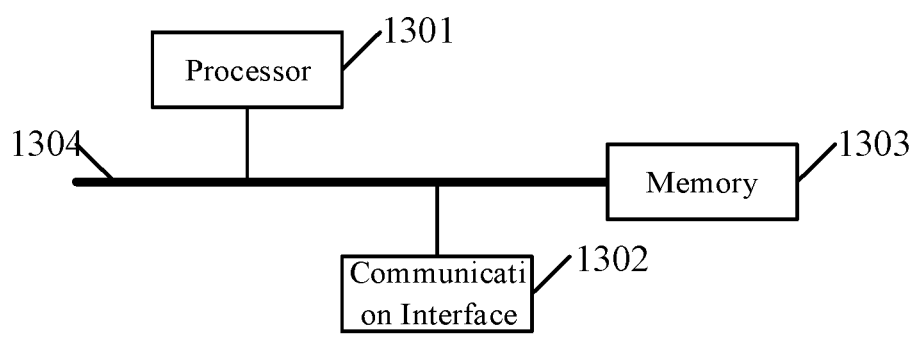
FIG. 13 is a structural diagram of an autonomous vehicle provided by an embodiment of the present application.

The embodiment of the present application provides an electronic device, which is applied to an autonomous vehicle. For example, the electronic device can be a detection device carried by the autonomous vehicle, or, for example, the electronic device can be a control device in the autonomous vehicle, etc. As shown in FIG. 13, the electronic device includes a processor 1301, a communication interface 1302, a memory 1303 and a communication bus 1304, wherein the processor 1301, the communication interface 1302 and the memory 1303 communicate with each other through the communication bus 1304, and the memory 1303 is used to store computer programs.

The processor 1301 is configured for, when executing the program stored in the memory 1303, implementing the steps of any radar-sensing detection method based on radar-sensing communication integration applied to the sending end provided by the above embodiment of the present application, and/or any radar-sensing detection method based on radar-sensing communication integration applied to the receiving end provided by the above embodiment of the present application.

The communication bus mentioned in the above electronic device can be peripheral component interconnect (PCI) bus or extended industry standard architecture (EISA) bus, etc. The communication bus can be divided into address bus, data bus, control bus, etc. For ease of representation, only one thick line is shown in the figure, but it does not mean that there is only one bus or one type of bus.

The communication interface is configured for communication between the above mentioned electronic device and other devices.

The memory may include random access memory (RAM) or non-volatile memory (NVM), such as at least one disk memory. Alternatively, the memory can also be at least one storage device located away from the processor above mentioned.

The processor above mentioned can be a general-purpose processor, including a central processing unit (CPU), a network processor (NP), etc; it can also be a digital signal processing (DSP), an application specific integrated circuit (ASIC), a field-programmable gate array (FPGA) or other programmable logic devices, discrete gate or transistor logic devices, and discrete hardware components.

The embodiment of the present application also provides a computer-readable storage medium storing a computer program, when being executed by the processor, the computer program performs the steps of any radar-sensing detection method based on radar-sensing communication integration applied to the sending end provided by the embodiment of the present application, and/or any radar-sensing detection method based on radar-sensing communication integration applied to the receiving end provided by the above embodiment of the present application.

The embodiment of the application provides a computer program product containing instructions, which when running on a computer, causes the computer to perform the steps of any the radar-sensing detection method based on radar-sensing communication integration applied to the sending end provided by the embodiment of the present application, and/or any radar-sensing detection method based on radar-sensing communication integration applied to the receiving end provided by the above embodiment of the present application.

The embodiment of the present application provides a computer program, when running on the computer, causes the computer to perform any of the steps of radar-sensing detection method based on radar-sensing communication integration applied to the sending end provided by the embodiment of the present application, and/or any radar-sensing detection method based on radar-sensing communication integration applied to the receiving end provided by the above embodiment of the present application.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an" do not exclude additional identical elements in the processes, methods, articles, or devices, including the listed elements.

Each embodiment in this description is described in a correlated manner, and identical or similar parts in various embodiments can be referred to each other. The description for each embodiment focuses on the differences from other embodiments. In particular, for the apparatus embodiment, the electronic device embodiment, the computer-readable storage medium embodiment, the computer program product embodiment and the computer program embodiment, since they are substantially similar to the method embodiment, the description is relatively simple, and the related contents can refer to the description of the method embodiment.

The foregoing descriptions are only preferred embodiments of the present application, and are not intended to limit the scope of protection of the present application. Any modification, equivalent replacement, improvement, etc. within the spirit and principle of the present application shall be included within the scope of protection of the present application.

What is claimed is:

1. A radar-sensing detection method based on radar-sensing communication integration, which is applied to a sending end, comprising:
   determining a position of a receiving end based on a radar-sensing detection signal or a communication signal sent to the receiving end;
   sending a beam control signal to the receiving end through a preset beam control request channel according to the position of the receiving end, wherein the beam control signal carries beam control information, and the beam control information comprises: frame control information, positioning request information, amount of data to be sent, beam occupation request information, channel occupation states, and spatial information check information; the frame control information is used to indicate demodulation information of the receiving end, and the positioning request information is used to broadcast vehicle information of the sending end itself, the beam occupation request information is used to request occupation of a spatial beam, the channel occupation states are used to inform the receiving end of an occupation state of a current channel, and the spatial information check information is configured for beam calibration;
   receiving a beam control response signal sent by the receiving end, wherein the beam control response signal carries a sending delay and a sending channel frequency band, and the sending delay is used to indicate a sending time for a first detection result signal to be sent, the sending channel frequency band is used to indicate a sending channel frequency band for the first detection result signal, and the first detection result signal is a signal that is generated by the sending end after detecting surrounding environment and carries position information of all vehicles within a preset detection range of the sending end;
   sending the first detection result signal to the receiving end in a preset reservation data channel according to the sending delay and the sending channel frequency band.

2. The method according to claim 1, wherein the step of determining a position of a receiving end based on a radar-sensing detection signal or a communication signal sent to the receiving end comprises:
   sending the radar-sensing detection signal when a distance between the sending end and the receiving end is less than the preset detection range of the sending end;
   receiving a reflected signal of the radar-sensing detection signal;
   determining the position of the receiving end according to the reflected signal;
   or,
   sending a position information acquisition request to a road-side unit RSU when a distance between the sending end and the receiving end is greater than the preset detection range of the sending end and less than a preset communication range of the sending end, wherein the position acquisition request is used to acquire the position information of the receiving end;
   receiving a response message returned by the RSU, wherein the response message carries the position information of the receiving end.

3. The method according to claim 2, wherein before the step of sending the first detection result signal to the receiving end in a preset reservation data channel according to the sending delay and the sending channel frequency band, the method further comprises:
   pre-allocating sending angles for multiple beams of the first detection result signal to be sent according to a preset Butler beam allocation scheme, so that the beams are orthogonal to each other;
   the step of sending the first detection result signal to the receiving end in a preset reservation data channel according to the sending delay and the sending channel frequency band comprises:
   sending, according to the sending delay and the sending channel frequency band, the first detection result signal to the receiving end through the sending angles pre-allocated for the multiple beams of the first detection result signal in the preset reservation data channel.

4. The method according to claim 1, wherein before the step of sending the first detection result signal to the receiving end in a preset reservation data channel according to the sending delay and the sending channel frequency band, the method further comprises:
   pre-allocating sending angles for multiple beams of the first detection result signal to be sent according to a preset Butler beam allocation scheme, so that the beams are orthogonal to each other;
   the step of sending the first detection result signal to the receiving end in a preset reservation data channel according to the sending delay and the sending channel frequency band comprises:
   sending, according to the sending delay and the sending channel frequency band, the first detection result signal to the receiving end through the sending angles pre-allocated for the multiple beams of the first detection result signal in the preset reservation data channel.

5. An electronic device, which is applied in an autonomous vehicle, comprising a processor, a communication interface, a memory and a communication bus, wherein the processor, the communication interface and the memory communicate with each other through the communication bus;
the memory is configured for storing a computer program;
the processor is configured for implementing the steps in the method of claim 1 when executing the computer program stored in the memory.

6. A non-transitory computer-readable storage medium, wherein a computer program is stored in the medium, the steps in the method of claim 1 are implemented when the computer program is executed by a processor.

7. A radar-sensing detection method based on radar-sensing communication integration, which is applied to a receiving end, comprising:
receiving a beam control signal sent by a sending end, wherein the beam control signal carries beam control information, and the beam control information comprises: frame control information, positioning request information, amount of data to be sent, beam occupation request information, channel occupation states and spatial information check information; the frame control information can be used to indicate demodulation information of the receiving end, the positioning request information is used to broadcast vehicle information of the sending end itself, the beam occupation request information is used to request occupation of a spatial beam, the channel occupation states are used to inform the receiving end of an occupation state of a current channel, and the spatial information check information is used to indicate beam calibration;
sending a beam control response signal to the sending end through a preset beam control channel, wherein the beam control response signal carries a sending delay and a sending channel frequency band, and the sending delay is used to indicate a sending time for a first detection result signal to be sent, the sending channel frequency band is used to indicate a sending channel frequency band for the first detection result signal, and the first detection result signal is a signal that is generated by the sending end after detecting surrounding environment and carries position information of all vehicles within a preset detection range of the sending end;
receiving the first detection result signal sent by the sending end;
performing fusion processing on data in the first detection result signal and data in a second detection result signal to obtain fused data, wherein the second detection result signal carries position information of all vehicles within a preset detection range of the receiving end, data amount of the fused data is less than a sum of data amount of the data in the first detection result signal and data amount of the data in the second detection result signal.

8. The method according to claim 7, wherein the step of performing fusion processing on data in the first detection result signal and data in the second detection result signal to obtain fused data comprises:
performing fusion processing on a first data table recording the data in the first detection result signal and a second data table recording the data in the second detection result signal to obtain the fused data.

9. The method according to claim 8, wherein the method further comprises:
sending a signal carrying the fused data to a vehicle within a preset communication range of the receiving end.

10. The method according to claim 7, wherein the method further comprises:
sending a signal carrying the fused data to a vehicle within a preset communication range of the receiving end.

11. An electronic device, which is applied in an autonomous vehicle, comprising a processor, a communication interface, a memory and a communication bus, wherein the processor, the communication interface and the memory communicate with each other through the communication bus;
the memory is configured for storing a computer program;
the processor is configured for implementing the steps in the method of claim 7 when executing the computer program stored in the memory.

12. A non-transitory computer-readable storage medium, wherein a computer program is stored in the medium, the steps in the method of claim 7 are implemented when the computer program is executed by a processor.

13. A radar-sensing detection apparatus based on radar-sensing communication integration, which is applied to a sending end, the apparatus comprises:
a determining module, configured for determining a position of a receiving end based on a radar-sensing detection signal or a communication signal sent to the receiving end;
a first sending module, configured for sending a beam control signal to the receiving end through a preset beam control request channel according to the position of the receiving end, wherein the beam control signal carries beam control information, and the beam control information comprises: frame control information, positioning request information, amount of data to be sent, beam occupation request information, channel occupation states and space information check information: the frame control information is used to indicate demodulation information of the receiving end, the positioning request information is used to broadcast vehicle information of the sending end itself, the beam occupation request information is used to request occupation of a spatial beam, the channel occupation states are used to inform the receiving end of an occupation state of a current channel, and the spatial information check information is used to indicate the beam calibration;
a first receiving module, configured for receiving a beam control response signal sent by the receiving end, wherein the beam control response signal carries a sending delay and a sending channel frequency band, the sending delay is used to indicate a sending time for a first detection result signal, and the sending channel frequency band is used to indicate a sending channel frequency band for the first detection result signal to be sent, the first detection result signal is a signal that is generated by the sending end after detecting surrounding environment and carries position information of all vehicles within a preset detection range of the sending end;
a second sending module, configured for sending the first detection result signal to the receiving end in a preset reservation data channel according to the sending delay and the sending channel frequency band.

14. The apparatus according to claim 13, wherein the determining module comprises:
- a first sending sub-module, configured for sending the radar-sensing detection signal when a distance between the sending end and the receiving end is less than the preset detection range of the sending end;
- a first receiving sub-module, configured for receiving a reflected signal of the radar-sensing detection signal;
- a first determining sub-module, configured for determining the position of the receiving end according to the reflected signal.

15. The apparatus according to claim 14, wherein the apparatus further comprises:
- an allocating module, configured for pre-allocating, before sending the first detection result signal to the receiving end in a preset reservation data channel according to the sending delay and the sending channel frequency band, sending angles for multiple beams of the first detection result signal to be sent according to a preset Butler beam allocation scheme so that the beams are orthogonal to each other;
- wherein the second sending module is specifically configured for sending, according to the sending delay and the sending channel frequency band, the first detection result signal to the receiving end through the sending angles pre-allocated for the multiple beams of the first detection result signal in the preset reservation data channel.

16. The apparatus according to claim 13, wherein the determining module comprises:
- a second sending sub-module, configured for sending a position information acquisition request to a RSU when a distance between the sending end and the receiving end is greater than the preset detection range of the sending end and less than a preset communication range of the sending end;
- a second receiving sub-module, configured for receiving a response message returned by the RSU.

17. The apparatus according to claim 13, wherein the apparatus further comprises:
- an allocating module, configured for pre-allocating, before sending the first detection result signal to the receiving end in a preset reservation data channel according to the sending delay and the sending channel frequency band, sending angles for multiple beams of the first detection result signal to be sent according to a preset Butler beam allocation scheme so that the beams are orthogonal to each other;
- wherein the second sending module is specifically configured for sending, according to the sending delay and the sending channel frequency band, the first detection result signal to the receiving end through the sending angles pre-allocated for the multiple beams of the first detection result signal in the preset reservation data channel.

18. A radar-sensing detection apparatus based on radar-sensing communication integration, which is applied to a receiving end, the apparatus comprises:
- a second receiving module, configured for receiving a beam control signal sent by a sending end, wherein the beam control signal carries beam control information, and the beam control information comprises: frame control information, positioning request information, amount of data to be sent, beam occupation request information, channel occupation states and spatial information check information: the frame control information is used to indicate demodulation information of the receiving end, the positioning request information is used to broadcast vehicle information of the sending end itself, the beam occupation request information is used to request occupation of a spatial beam, the channel occupation states are used to inform the receiving end of an occupation state of a current channel, and the spatial information check information is used to indicate beam calibration;
- a third sending module, configured for sending a beam control response signal to the sending end through a preset beam control channel, wherein the beam control response signal carries a sending delay and a sending channel frequency band, and the sending delay is used to indicate a sending time for a first detection result signal to be sent, the sending channel frequency band is used to indicate a sending channel frequency band for the first detection result signal, the first detection result signal is a signal that is generated by the sending end after detecting surrounding environment and carries position information of all vehicles within a preset detection range of the sending end;
- a third receiving module, configured for receiving the first detection result signal sent by the sending end;
- a fusing module, configured for performing fusion processing on data in the first detection result signal and data in a second detection result signal to obtain fused data, wherein the second detection result signal carries position information of all vehicles within a preset detection range of the receiving end, data amount of the fused data is less than a sum of data amount of the data in the first detection result signal and data amount of the data in the second detection result signal.

19. The apparatus according to claim 18, wherein the fusing module is specifically configured for performing fusion processing on a first data table recording the data in the first detection result signal and a second data table recording the data in the second detection result signal to obtain the fused data.

20. The apparatus according to claim 18, wherein the apparatus further comprises:
- a fourth sending module, configured for sending a signal carrying the fused data to a vehicle within a preset communication range of the receiving end.

* * * * *